United States Patent
Ainscough et al.

(10) Patent No.: US 10,923,745 B2
(45) Date of Patent: Feb. 16, 2021

(54) SYSTEMS AND METHODS FOR FUEL CELL GAS CIRCULATION

(75) Inventors: Christopher Ainscough, Nashua, NH (US); David Henderson, Cambridge, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 12/232,309

(22) Filed: Sep. 15, 2008

(65) Prior Publication Data

US 2010/0068579 A1    Mar. 18, 2010

(51) Int. Cl.
*H01M 8/04089* (2016.01)
*H01M 8/04119* (2016.01)
*H01M 8/0438* (2016.01)

(52) U.S. Cl.
CPC ... *H01M 8/04097* (2013.01); *H01M 8/04104* (2013.01); *H01M 8/04164* (2013.01); *H01M 8/04388* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 5,441,821 A * | 8/1995 | Merritt et al. | 429/410 |
| 5,798,187 A * | 8/1998 | Wilson et al. | 429/437 |
| 6,596,429 B2 | 7/2003 | Shimanuki et al. | |
| 7,037,609 B2 | 5/2006 | Sugawara et al. | |
| 2004/0219406 A1 | 11/2004 | Sugawara et al. | |
| 2005/0064255 A1 | 3/2005 | Blaszczyk et al. | |
| 2005/0208357 A1 | 9/2005 | Bitzer et al. | |
| 2005/0214609 A1 * | 9/2005 | McElroy | 429/26 |
| 2005/0214617 A1 | 9/2005 | Chapman et al. | |
| 2007/0031325 A1 * | 2/2007 | Carruthers | B01D 53/228 423/658.2 |
| 2007/0065696 A1 * | 3/2007 | Fukuma et al. | 429/26 |
| 2007/0141408 A1 * | 6/2007 | Jones | 429/17 |
| 2007/0160879 A1 * | 7/2007 | Kaye | G01F 1/36 429/446 |
| 2007/0287040 A1 | 12/2007 | Toro | |
| 2008/0160353 A1 * | 7/2008 | Savage | H01M 8/04097 429/414 |
| 2008/0280167 A1 * | 11/2008 | Pedersen | H01M 8/04731 429/409 |

OTHER PUBLICATIONS

2012 ASHRAE Handbook—Heating, Ventilating, and Air-Conditioning Systems and Equipment (SI Edition). American Society of Heating, Refrigerating and Air-Conditioning Engineers, Inc. Online: <URL http://app.knovel.com/hotlink/toc/id:kpASHRAE2/ashrae-handbook-heating-3>, 2012, p. 44.5.*

* cited by examiner

*Primary Examiner* — Jonathan Crepeau
(74) *Attorney, Agent, or Firm* — Finnegan, Henderson, Farabow, Garrett & Dunner, LLP

(57) ABSTRACT

A fuel cell system has a gas delivery-means that circulates the anode exhaust gas back to the anode compartment of the fuel cell for further reaction.

11 Claims, 3 Drawing Sheets

SYSTEMS AND METHODS FOR FUEL CELL GAS CIRCULATION

The present disclosure is generally directed to a fuel cell system that circulates the anode exhaust back to the anode compartment of a fuel cell. The disclosure is also directed to a fuel cell system which comprises one gas ejector and a fuel cell having an open flowfield in its anode compartment.

A typical polymeric electrolyte membrane (PEM) fuel cell comprises several components. Central to its function is a polymeric membrane that serves as an electrolyte, conducting protons when hydrated. One side of the membrane is in contact with an anode catalyst, i.e., the anode side, while the other side of the membrane is in contact with a cathode catalyst, i.e., the cathode side. The anode catalyst effectuates the dissociation of hydrogen into its constituent protons and electrons—the protons migrate through the membrane from the anode side to the cathode side, where they recombine with activated oxygen species (via the action of the cathode catalyst and free electrons) to form water. A membrane electrode assembly (MEA) refers to a polymeric membrane that has the anode catalyst on its anode side and the cathode catalyst on its cathode side. To facilitate electron flow, a conducting media known as a gas diffusion layer (GDL) is included on each of the anode and the cathode side of the membrane. The gas diffusion layer is made of carbon paper, graphite cloth, or other porous, flexible, and electrically conductive materials. An electrochemical package (ECP) refers to a package containing an MEA sandwiched between two gas diffusion layers. The package may consist of these individual elements simply laid adjacent to one another, or as a physically and/or chemically attached composite structure. Adjacent to the gas diffusion layer on both sides of the membrane are compartments through which reactant and product species are transported.

A fuel gas, e.g., a hydrogen-containing gas, is fed to the anode compartment, which is the space between the anode side of the MEA (or ECP) and an electrically conductive (e.g. graphite or metal) barrier, i.e., a bipolar plate. An oxygen-containing gas, e.g., air, is fed to the cathode compartment, which is the space between the cathode side of the MEA (or ECP) and a bipolar plate.

A fuel cell is designed so that hydrogen can readily reach the anode side of the polymer membrane while oxygen can readily reach the cathode side. Electrically conductive spacers are used to create fluid passages in the anode compartment and cathode compartment respectively, which allow gases to flow through. The spacer can be made from a material that is electrically conductive and by design allows fluids to pass through. Therefore, the spacers are also referred to as flowfields. As used herein, the terms "flowfield" and "flowfield spacer" and "spacer," all of which refer to a component with multiple functions, are used interchangeably in this disclosure.

Fuel cell flowfields are commonly made of plates having discrete flow channels. Flowfields can also be made of porous structures such as metal foam, metal mesh, metal screen, featured plates that include perforations, or laminates composed of such elements, etc. Such porous flowfields are referred to as open flowfields because of the less well-defined flow passages within the flowfield, and are contrasted to directed flowfields by virtue of the existence of entirely intra-cell fluidic paths between any two points in the flowfield. One of the advantages of the open flowfield is that the pressure drop of the gas across the open flowfield is low.

A single fuel cell typically comprises an ECP, an anode compartment, a cathode compartment, spacers within the anode or the cathode compartments, and a cooling section. A fuel cell "stack" comprises multiple single fuel cells connected electrically in series through electrically conductive plates. These electrically conductive plates are referred to as "bipolar plates".

A fuel cell can operate in a "dead-end" mode in which the outlet of the anode compartment is closed and while the hydrogen is consumed inside the anode compartment. The "dead-end" mode of operation requires a high purity hydrogen fuel gas, e.g., >99.9% hydrogen. It also requires periodic purges to remove water generated in the reaction and other impurities in the hydrogen fuel gas. A fuel cell can also operate in a "flow-through" mode in which the fuel gas flow through the anode compartment continuously while a portion of the hydrogen in the fuel gas is consumed in the anode compartment. The hydrogen utilization refers to the percentage of hydrogen consumed in the fuel cell among hydrogen provided to the fuel cell. The hydrogen utilization in one single "flow-through" is lower than that in the hydrogen utilization in the "dead-end" mode of operation and the exhaust gas from the anode outlet contains substantial amount of hydrogen. To increase the overall hydrogen utilization, the anode exhaust can be circulated back to the anode compartment for further reaction of hydrogen.

One of the challenges in anode exhaust circulation is that a circulation pump and/or multiple ejectors may be needed to supply fuel at both the minimum and the maximum power output of the fuel cell. A circulation pump for hydrogen-containing anode exhaust tends to be power intensive. Multiple ejectors with different size nozzles can be costly and increases the complexity in control. This disclosure provides a system that delivers the anode exhaust to the anode compartment using one gas ejector.

The disclosure provides a fuel cell system that circulates the anode exhaust gas back to the anode compartment of the fuel cell for further reaction. The fuel cell system comprises a fuel cell having an anode compartment with an inlet and an outlet; an anode gas in the anode compartment, creating an anode pressure;

a source of a hydrogen-containing fuel gas fluidly connected to the inlet of the anode compartment through a first conduit;

a control valve installed in the first conduit;

a gas-delivery means installed in the first conduit between the control valve and the anode compartment;

a second conduit fluidly connecting the outlet of the anode compartment and the gas-delivery means; and an anode exhaust gas flowing from the outlet of the anode compartment into the gas-delivery means, wherein when the anode pressure is lower than a preset value, the control valve opens and the hydrogen-containing fuel gas flows into the gas-delivery means, mixing with the anode exhaust gas in the gas-delivery means to form an anode gas and the anode gas flows into the anode compartment of the fuel cell.

The fuel cell in the fuel cell system may have an open flowfield. The control valve in the fuel cell system is pneumatically opened or closed in response to the variations in the anode pressure and/or the fuel gas pressure. The fuel cell system further separates excess water generated in the fuel cell from the anode exhaust.

This disclosure also provides a method for circulating anode exhaust from a fuel cell to the anode compartment of the fuel cell for further reaction. The method comprises:

providing a source of a fuel gas;

fluidly connecting the source of the fuel gas to an inlet of the anode compartment through a first conduit;

installing a control valve in the first conduit between the source of the fuel gas to the inlet of the anode compartment;

installing a gas-delivery means in the first conduit between the control valve and the inlet of the anode compartment;

setting a value of pressure in the anode compartment below which the control valve opens to allow the fuel gas flowing into the gas delivery means;

fluidly connecting an outlet of the anode compartment to the gas-delivery means through a second conduit, wherein an exhaust gas from the anode compartment passes; and mixing the exhaust gas from the anode compartment with the fuel gas to form an anode gas.

The present disclosure is described in connection with the embodiments presented below. These embodiments are presented to assist the understanding of the invention and are not intended to, and should not be construed, to limit the invention. Alternatives, modifications, and equivalents that may become obvious to those of ordinary skill in the art upon reading the disclosure are included within the spirit and scope of the present invention.

Figure 1:
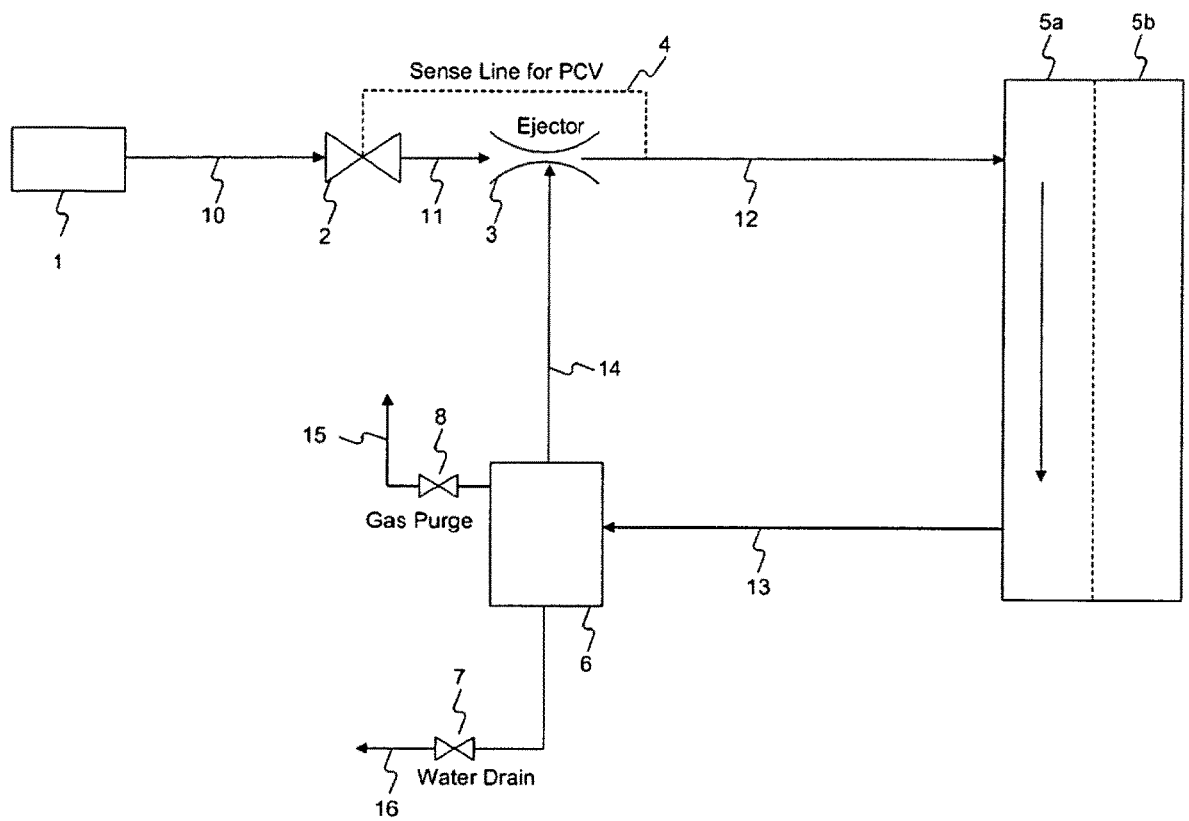
FIG. 1 is one of the embodiments of the fuel cell system.

FIG. 1 shows a fuel cell system according to an embodiment of this disclosure. Block 1 represents a source of a fuel gas at an elevated pressure, for instance, ranging from 50 psig to 10,000 psig. The fuel gas can be a substantially pure hydrogen gas, e.g., with purity above 99.9%, or a gas mixture that contains 80% or more hydrogen. The source of the fuel gas is connected to a control valve 2 through line 10.

A "motive gas", used herein, refers to a high pressure fuel gas that enters a gas ejector. The "motive gas pressure," used therein, refers to the pressure of the motive gas or the pressure of a mixture of the motive gas and the anode exhaust gas at the inlet of the orifice or the Venturi tube in the gas ejector. An "anode gas" refers to the gas downstream of the ejector which flows into the anode compartment of a fuel cell. An "anode exhaust gas" refers to the exhaust gas from the anode compartment. The control valve 2 references the gas pressure in the anode compartment, i.e., the anode pressure. In a fuel cell with low pressure drop, e.g., a fuel cell having an open flowfield, the pressure differential between the inlet and the outlet of the anode compartment can be less than 40-millibar. Since the accuracy of the pressure is not critical, the anode pressure not only may be measured inside the anode compartment but also may be measured at the inlet or at the outlet of the anode compartment. The anode pressure can be set at a value ranging from 1-30 psig, for example, a value ranging from 4-20 psig.

In one embodiment, the control valve 2 is connected to a gas ejector 3 through line 11. A pressure sense line 4 connects the control valve 2 to the anode gas downstream of the gas ejector 3. The gas ejector 3 has a second inlet which is connected to a separator 6 through line 14. The anode exhaust gas, after dropping out water in the separator 6, flows into the gas ejector 3 through line 14. The gas ejector 3 may comprise an orifice plate or a Venturi tube. When the high pressure motive gas passes through the orifice or the Venturi, it creates a low pressure region at the entrance of the orifice or the narrow in the Venturi tube so that the anode exhaust gas may flow into this low pressure region and mix with the motive gas. The gas mixture exits the gas ejector 3 and enters the fuel cell anode compartment 5a of the fuel cell 5 as the anode gas through line 12.

The anode gas passes through the anode 5a of the fuel cell 5, where some of the hydrogen in the anode gas is consumed. The anode exhaust is connected with the separator 6 through line 13. The excess water in the anode exhaust is dropped out from the gas phase in the separator 6. The water in separator 6 is then drained through line 16 periodically by opening a valve 7 in line 16. Impurities in the anode exhaust, such as $N_2$ or $CO_2$ accumulates overtime. The separator 6 provides a gas purge line 15 with a valve 8, through which the impurities gas can be periodically purged.

Figure 2:
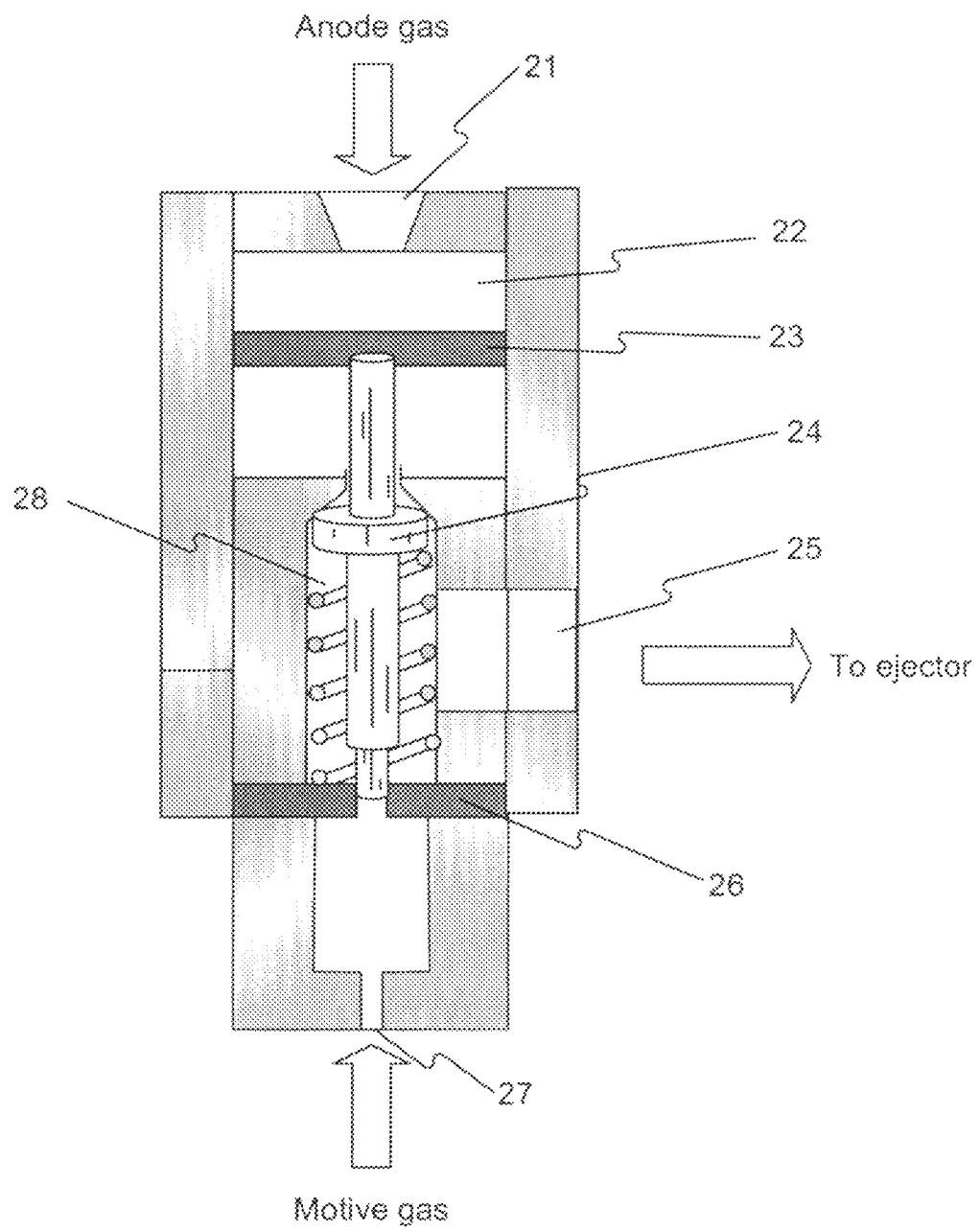
FIG. 2 is a schematic of one embodiment of the control valve in the fuel cell system.

FIG. 2 depicts a control valve. The valve has a port 21 where the anode gas enters. A piston 23 can move up and down inside the chamber 22. A poppet 24 has one of its two ends in contact with the piston and the other end exposed to a motive gas, which enters through port 27. A spring 28 is also installed and in contact with the poppet 24. When compressed, the spring exerts a force on the piston via the poppet 24. When the sum of the force exerted against the poppet 24 by the spring and the force exerted on the poppet 24 by the motive gas is less than the force exerted by the anode gas on the poppet via the piston 22, the poppet 24 is pushed against the valve seat 26 and closes the valve. On the contrary, when the sum of the force exerted against the poppet 24 by the spring and the force exerted on the poppet by the motive gas is larger than the force exerted by the anode gas, the poppet 24 is lifted from the valve seat 26 and motive gas passes through. In this embodiment, the influence of the motive gas and the pressure of the gas at the outlet of the valve 25 on the position of the piston 23 and the poppet 24 are relatively small in comparison to the influence of the spring. Therefore, by selecting a spring, one may effectively set the anode pressure at which the valve opens.

In one aspect of the embodiment of this disclosure, the control valve can be properly sized so that when the anode pressure is below one preset value, the poppet opens to allow motive gas enter the gas ejector. The resulting anode gas subsequently enters the anode compartment of the fuel cell. The addition of anode gas in turn increases the anode pressure. Once the anode pressure reaches the pre-set value, the poppet in the control valve seals the valve seat to cut off the motive gas.

Figure 3:
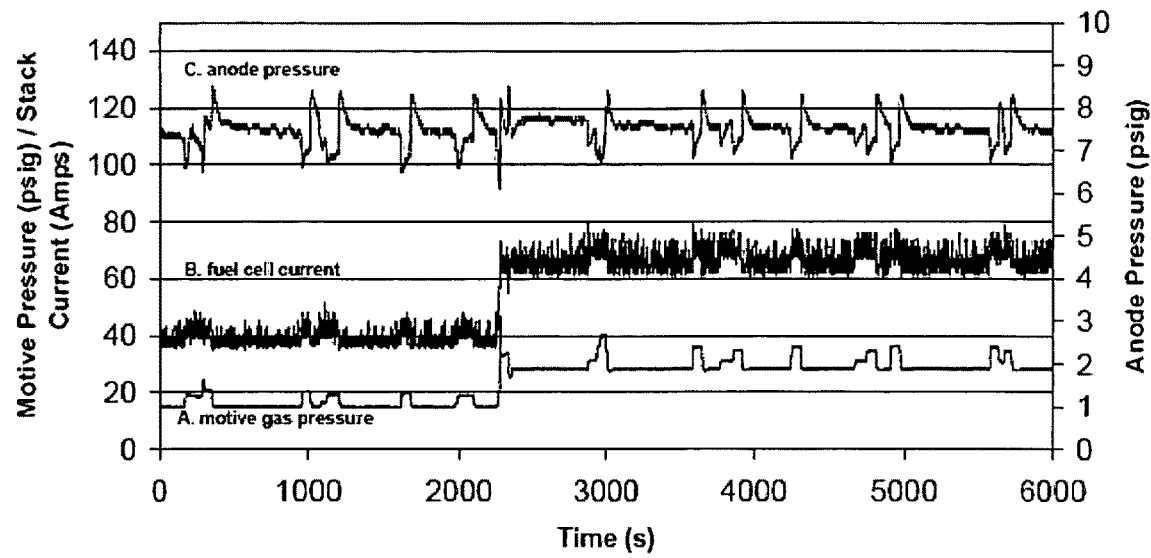
FIG. 3 is a data plot showing the changes in the anode pressure and the motive pressure in response to the change in the stack current.

FIG. 3 is a plot showing experimental data obtained from a fuel cell system of FIG. 1. In this set of experiments, the pre-set anode pressure was 7.5 psig. Line C shows the anode pressure, whose value refers to the Y-axis on the right hand side of FIG. 3. Line B is the current drawn from a fuel cell stack. Line A shows the motive gas pressure at the inlet of the gas ejector. The values of Line A and Line B refer to the Y-axis on the left hand side of FIG. 3. Between time zero to about 2200 seconds, the current drawn from the fuel cell stack is about 40 amps. The motive gas pressure is about 16 psig, while the anode pressure is about 7.5 psig. The steps in the motive gas pressure Line A is due to the opening and closing of the control valve. The fluctuations in the motive gas pressure also create noises in the anode pressure. Consequently, the anode pressure may fluctuate between about 6.5 psig to 8.5 psig. However, the average anode pressure stays at about 7.5 psig. The fuel cell stack tolerates such a level of pressure fluctuation.

Pressure fluctuations may be intentionally induced in order to create momentary periods of high motive gas flows through the ejector during otherwise low flow conditions, e.g., when the baseline anode pressure is relatively high. Such high motive gas flows enable recirculation of anode gas. This extends the operational range of the gas ejector.

Nevertheless, if pressure fluctuations are not desirable, a pressure dampener or a fixed orifice plate can be installed between the gas ejector and the fuel cell anode compartment to reduce the anode pressure fluctuations.

As shown in FIG. 3, at the time of 2200 seconds, the current drawn from the fuel cell stack increased to about 65 amps. The reaction rate of hydrogen in the anode compartment increased simultaneously. If the anode gas supply did not increase, the anode pressure would have dropped. Sensing the tendency of a decrease in anode pressure, the motive gas pressure increased to about 28 psig so that the flow rate of the combination of the fuel gas and anode exhaust passing through the gas ejector increased. This increase in anode gas compensated the faster consumption of hydrogen in the anode compartment and kept the anode pressure at about 7.5 psig.

It will be apparent to those skilled in the art that various modifications and variations can be made without departing from the spirit of the invention. The present invention covers all such modifications and variations, provided they come within the scope of the claims and their equivalents.

We claim:

1. A fuel cell system, comprising:
   a fuel cell comprising an anode compartment having an inlet, an outlet, and an open flowfield made of a material chosen from metal foam, metal mesh, metal screen, corrugated metal sheet, graphite foam, and graphite mesh;
   an anode gas in the anode compartment and creating an anode pressure ranging from 1 psig to 30 psig;
   a source of a hydrogen-containing fuel gas fluidly connected to the inlet of the anode compartment through a first conduit;
   a control valve installed in the first conduit, the control valve comprising a spring and a poppet, the spring being in contact with the poppet;
   a single gas ejector, the gas ejector being installed in the first conduit between the control valve and the anode compartment;
   a fixed orifice plate, the fixed orifice plate being installed in the first conduit between the single gas ejector and the anode compartment;
   a second conduit fluidly connecting the outlet of the anode compartment and the gas ejector;
   a liquid separator installed in the second conduit between the outlet of the anode compartment and the gas ejector, the liquid separator being connected to a first exhaust line and a second exhaust line;
   an anode exhaust gas flowing from the outlet of the anode compartment into the gas ejector,
   wherein when the anode pressure inside the anode compartment is lower than a preset value corresponding to a force exerted by the spring on the poppet, the spring moves the poppet to open the control valve, allowing the hydrogen-containing fuel gas to flow into the gas ejector and mix with the anode exhaust gas in the gas-delivery means to form the anode gas, and
   wherein the liquid separator separates water and impurities gas from the anode exhaust before the anode exhaust enters the gas ejector, drains the water through the first exhaust line, and purges the impurities gas through the second exhaust line.

2. The fuel cell system of claim 1, wherein the gas ejector comprises an orifice plate or a Venturi tube.

3. The fuel cell system of claim 1, wherein the anode pressure ranges from 4 psig to 20 psig.

4. The fuel cell system of claim 1, wherein the preset pressure ranges from 1 psig to 30 psig.

5. The fuel cell system of claim 4, wherein the preset value ranges from 4 psig to 20 psig.

6. The fuel cell system of claim 1, wherein the hydrogen-containing fuel gas is hydrogen gas having a purity of 80% or higher.

7. The fuel cell system of claim 1, wherein the pressure of the source of the fuel gas ranges from 50 psig to 10,000 psig.

8. The fuel cell system of claim 1, wherein the control valve is opened or closed pneumatically in response to the pressure difference between the anode gas and the fuel gas.

9. The fuel cell system of claim 1, wherein the impurities gas includes at least one of nitrogen ($N_2$) gas or carbon dioxide ($CO_2$) gas.

10. The fuel cell system of claim 1, further comprising a valve installed in the first exhaust line and configured to control draining of the water.

11. The fuel cell system of claim 1, further comprising a valve installed in the second exhaust line and configured to control purging of the impurities gas.

* * * * *